US012428811B2

(12) United States Patent
Cardoso et al.

(10) Patent No.: US 12,428,811 B2
(45) Date of Patent: Sep. 30, 2025

(54) CONSTRUCTION MACHINE WITH ACTIVE RIDE CONTROL

(71) Applicant: Robert Bosch GmbH, Stuttgart (DE)

(72) Inventors: Rafael Cardoso, Fountain Inn, SC (US); Edwin J.J. Heemskerk, Margetshoechheim (DE); Frank C. Karsten, Wooster, OH (US); Enrique Busquets, Fountain Inn, SC (US); Jeremy Gruenenfelder, Greenville, SC (US)

(73) Assignee: Robert Bosch GmbH, Stuttgart (DE)

( * ) Notice: Subject to any disclaimer, the term of this patent is extended or adjusted under 35 U.S.C. 154(b) by 338 days.

(21) Appl. No.: 17/983,077

(22) Filed: Nov. 8, 2022

(65) Prior Publication Data

US 2023/0160176 A1 May 25, 2023

Related U.S. Application Data

(60) Provisional application No. 63/281,127, filed on Nov. 19, 2021.

(51) Int. Cl.

*E02F 9/20* (2006.01)
*E02F 9/22* (2006.01)
*F15B 15/20* (2006.01)

(52) U.S. Cl.

CPC .......... *E02F 9/2025* (2013.01); *E02F 9/2228* (2013.01); *E02F 9/2267* (2013.01);

(Continued)

(58) Field of Classification Search

CPC ..... E02F 9/2025; E02F 9/2228; E02F 9/2267; E02F 9/2271; E02F 9/2296; F15B 15/20

(Continued)

(56) References Cited

U.S. PATENT DOCUMENTS 6,170,587 B1 * 1/2001 Bullock ................. B60K 6/365 903/910
6,357,230 B1 * 3/2002 A'Hearn ............... E02F 9/2217 60/413

(Continued)

FOREIGN PATENT DOCUMENTS

CN 105064444 A * 11/2015
DE 102009025683 A1 12/2010

(Continued)

OTHER PUBLICATIONS

Rexroth, "Axial piston variable pump A10VO series 32," available at <https://www.boschrexroth.com/documents/12605/25209043/re92705_2021-08-25.pdf/11a5ddfd-097d-3004-4aaa-420a638d9184?routed=true> dated Aug. 25, 2021 (72 pages).

(Continued)

*Primary Examiner* — Saul Rodriguez
*Assistant Examiner* — Brendan P Tighe
(74) *Attorney, Agent, or Firm* — Michael Best & Friedrich LLP

(57) ABSTRACT

A construction machine including a variable displacement pump, and a boom cylinder including a rod operable to extend and retract to move a boom of the construction machine. A first chamber of the boom cylinder is configured to be supplied with fluid from the pump during rod extension while fluid is removed from a second chamber of the boom cylinder. The second chamber of the boom cylinder is configured to be supplied with fluid from the pump during rod retraction while fluid is removed from the first chamber of the boom cylinder. The construction machine has an active ride control mode in which a valve between the boom cylinder and the pump remains open, and the pump is configured to actively damp pressure fluctuations in the boom cylinder by variation of a displacement setting.

20 Claims, 6 Drawing Sheets

(52) U.S. Cl.
CPC .......... *E02F 9/2271* (2013.01); *E02F 9/2296* (2013.01); *F15B 15/20* (2013.01)

(58) Field of Classification Search
USPC .......................................................... 414/680
See application file for complete search history.

(56) References Cited

U.S. PATENT DOCUMENTS

| | | | | |
|---|---|---|---|---|
| 6,634,653 | B2 * | 10/2003 | Chatterjea | E02F 9/2217 280/5.5 |
| 6,988,363 | B2 | 1/2006 | Bitter | |
| 7,870,726 | B2 | 1/2011 | Matsui | |
| 8,360,180 | B2 * | 1/2013 | Hoff | B60L 50/16 180/65.265 |
| 8,606,448 | B2 * | 12/2013 | Anders | B60K 6/12 903/903 |
| 9,693,502 | B2 | 7/2017 | Gofron et al. | |
| 10,214,102 | B2 * | 2/2019 | Ornella | B60K 17/356 |
| 10,215,199 | B2 * | 2/2019 | Cosoli | F15B 1/04 |
| 10,215,276 | B2 * | 2/2019 | Serrao | F16H 61/452 |
| 10,220,697 | B2 * | 3/2019 | Dousy | F15B 1/04 |
| 10,830,347 | B2 * | 11/2020 | Giorgio Bort | E02F 9/2296 |
| 2005/0011190 | A1 * | 1/2005 | Bitter | F15B 13/021 60/468 |
| 2006/0218915 | A1 | 10/2006 | Dix | |
| 2011/0082610 | A1 * | 4/2011 | Kawasaki | F15B 21/14 903/930 |
| 2014/0256505 | A1 * | 9/2014 | Dalum | B60L 50/90 477/3 |
| 2017/0072778 | A1 * | 3/2017 | Ornella | B60K 25/06 |
| 2018/0355584 | A1 * | 12/2018 | Joo | E02F 9/2292 |
| 2021/0207344 | A1 * | 7/2021 | Kang | F15B 11/024 |
| 2022/0252084 | A1 * | 8/2022 | Kang | E02F 9/2225 |
| 2022/0397133 | A1 * | 12/2022 | Tripathi | F15B 1/024 |
| 2023/0287650 | A1 * | 9/2023 | Kang | E02F 9/2267 |
| 2025/0198122 | A1 * | 6/2025 | Naruo | F15B 21/087 |

FOREIGN PATENT DOCUMENTS

| | | | | |
|---|---|---|---|---|
| JP | H0949503 | A | 2/1997 | |
| JP | 2019210670 | A | 12/2019 | |
| KR | 20130055302 | A | 5/2013 | |
| WO | WO-2010145733 | A1 * | 12/2010 | E02F 3/283 |

OTHER PUBLICATIONS

German Patent Office Action for Application No. 102022212178.3 dated Sep. 21, 2023 (7 pages including statement of relevance).

* cited by examiner

CONSTRUCTION MACHINE WITH ACTIVE RIDE CONTROL

CROSS-REFERENCE TO RELATED APPLICATIONS

This application claims the benefit of priority of U.S. Provisional Patent Application No. 63/281,127, filed Nov. 19, 2021, the entire contents of which are incorporated by reference herein.

BACKGROUND

The present invention relates to construction machines, for example, wheel loaders, compact track loaders, etc. and more particularly to ride control in such machines when configured in a designated transport mode. As is often the case, these construction machines do not have shock-absorbing suspension components between the main frame and their drive wheels or tracks.

Typical ride control (e.g., U.S. Pat. No. 6,357,230 B1) in construction machines are provided by an accumulator 1 and a valve block 2 to connect the accumulator to boom cylinder 3 as represented in FIG. 1. This valve block 2 is used instead of the main boom control valve 4 during transport mode, usually when the machine is moving above certain speed. For ride control mode, the main boom control valve 4 blocks fluid communication between the boom cylinder 3 and the pump 5. This system provides a dampening to the implement vibration caused by uneven terrain when the machine is driving through it. The pressure fluctuation in the boom cylinder 3 is absorbed by the accumulator 1 to provide a cushioning effect. This conventional system can be referred to as passive ride control as it relies entirely in the accumulator 1, and there is no direct intentional actuation coming from any controller to improve or prevent machine oscillation. In short, the accumulator 1 receives oil at peak pressures on the boom cylinder 3 (e.g., machine is passing through a bump), and the accumulator 1 supplies oil when the pressure is low in the boom cylinder 3, reducing vibrations during drive.

Passive ride control requires an additional installation of a large capacity accumulator 1 and a separate valve control valve block 2. Passive ride control cannot prevent fluctuation caused by oil leakage and it has fixed settings, with different performance when the machine is in low speed when compared to high speed. To solve these issues, some active ride control solutions were proposed in the past such as KR20130055302A, an example of which is represented in FIG. 2. Without using an accumulator, these solutions reduce the pressure fluctuations in the boom cylinder 3 by inserting pressure from the pump 5 or relieving the pressure to tank through a directional valve, namely the main boom control valve 4. A pressure sensor 6 is used as feedback for the active ride control, eliminating the need of an accumulator. These active ride control solutions incur a significant delay time caused by command delay and response delay in switching the directional valve 4. In addition, non-linearities in this switching system makes it hard to provide a stable and robust ride control solution.

SUMMARY

In one aspect, the invention provides a construction machine including a variable displacement pump and a boom cylinder having a rod operable to extend and retract to move a boom of the construction machine. A first chamber of the boom cylinder is configured to be supplied with fluid from the pump during rod extension while fluid is removed from a second chamber of the boom cylinder. The second chamber of the boom cylinder is configured to be supplied with fluid from the pump during rod retraction while fluid is removed from the first chamber of the boom cylinder. The construction machine has an active ride control mode in which a valve between the boom cylinder and the pump remains open, and the pump is configured to actively damp pressure fluctuations in the boom cylinder by variation of a displacement setting.

In another aspect, the invention provides a method of actively damping a boom of a construction machine. A boom cylinder is provided having first and second piston-separated variable-volume chambers, a rod of the boom cylinder connected with the boom for moving the boom by selective extension and retraction of the rod. At least one of the first and second chambers of the boom cylinder is connected with the variable displacement pump for fluid exchange in an active ride control mode of the construction machine. Pressure fluctuations in the boom cylinder are actively damped by varying a displacement setting of the pump in the active ride control mode.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Figure 1:
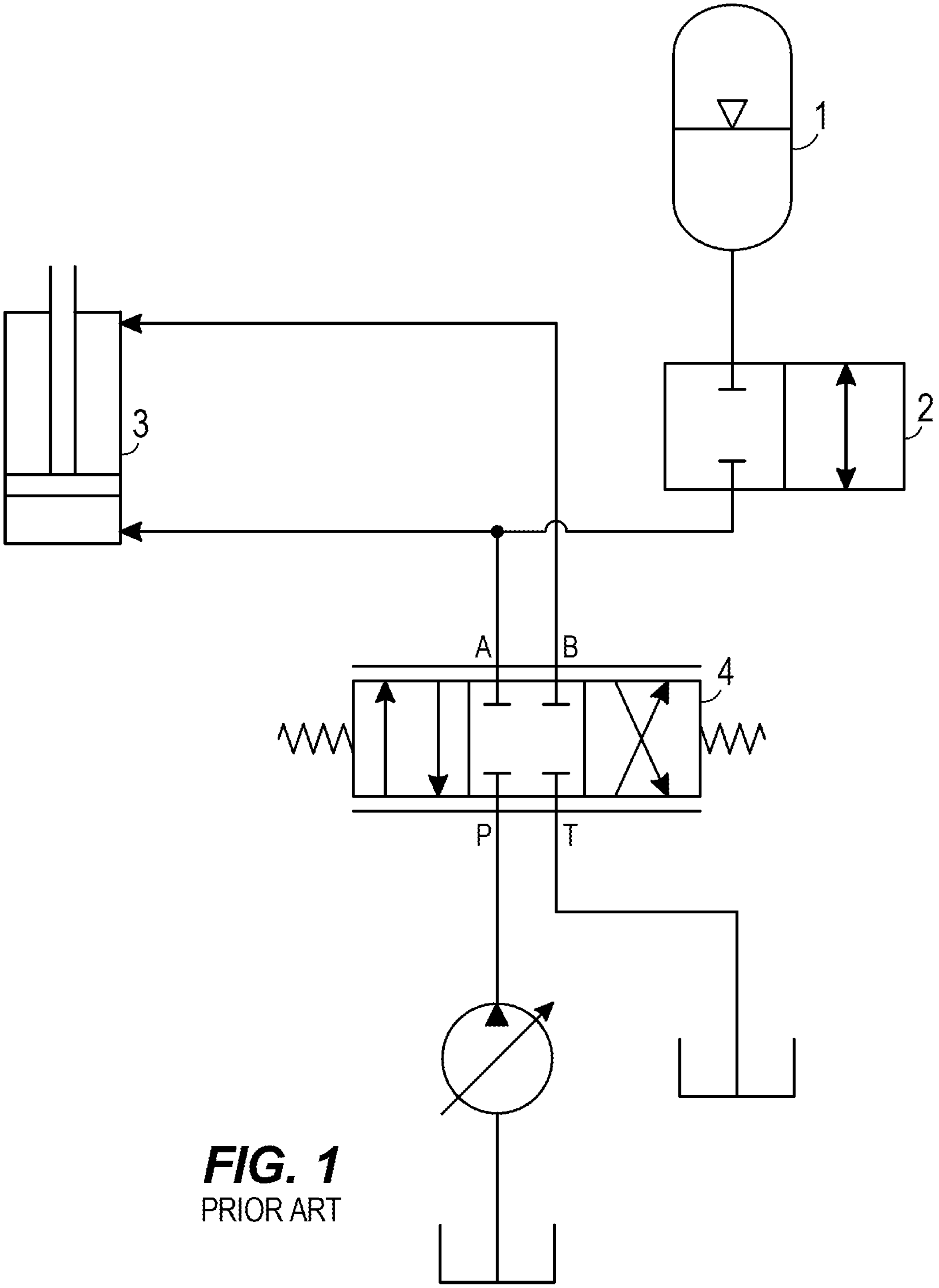
FIG. 1 PRIOR ART
FIG. 1 illustrates a passive ride control system for a construction machine, according to the prior art.
Figure 2:
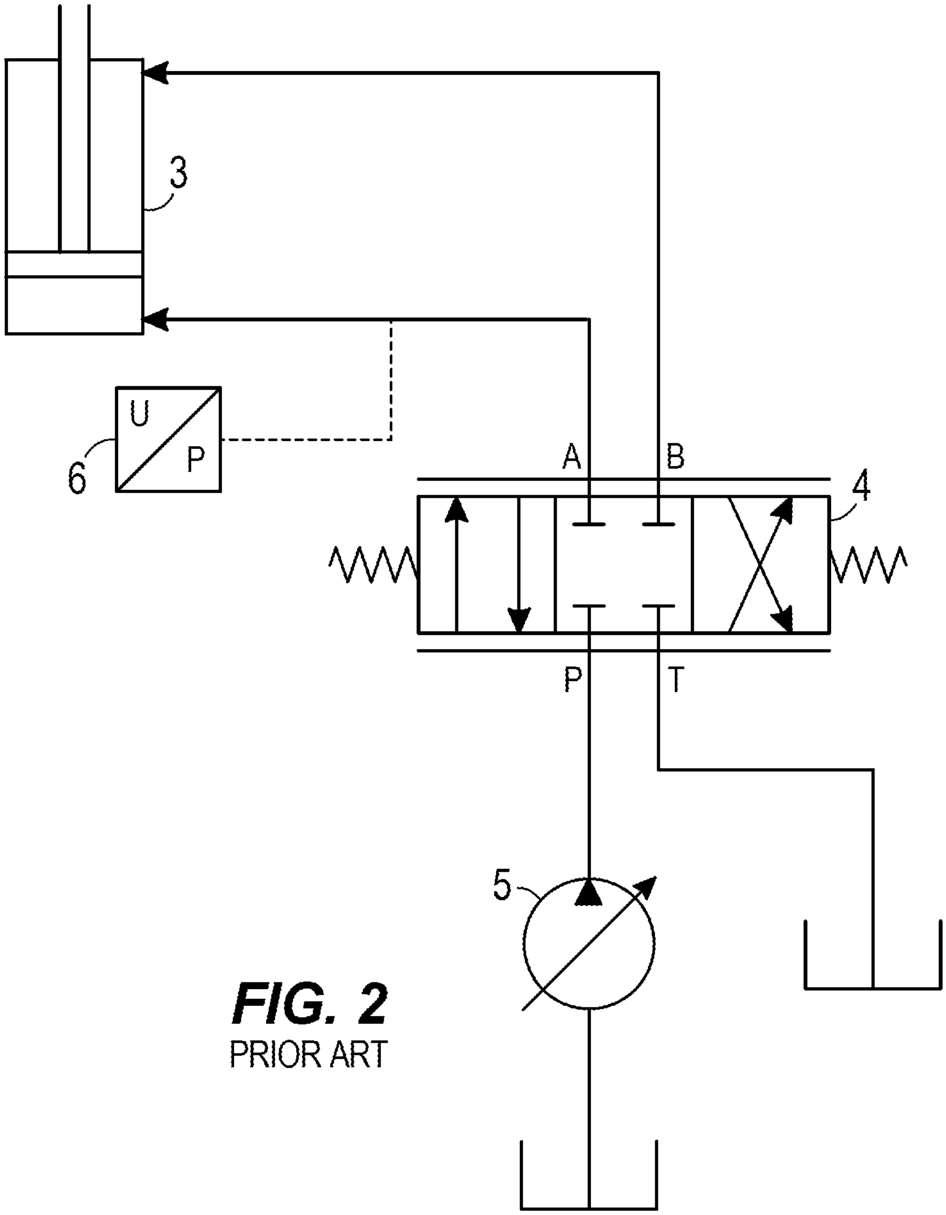
FIG. 2 PRIOR ART
FIG. 2 illustrates an active ride control system for a construction machine, according to the prior art.
Figure 3:
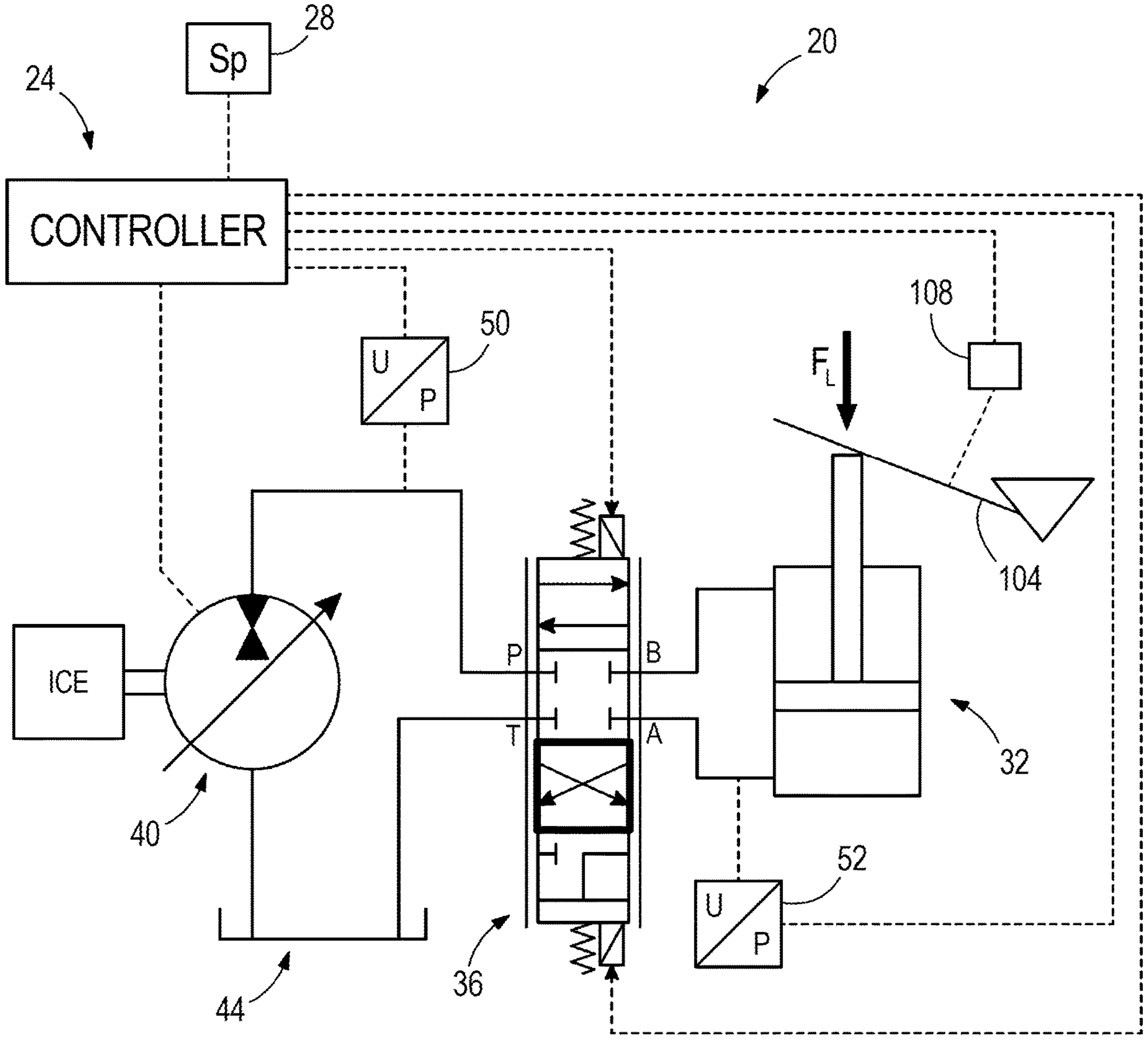
FIG. 3 illustrates an active ride control system for a construction machine, according to one embodiment of the present disclosure.
Figure 5:
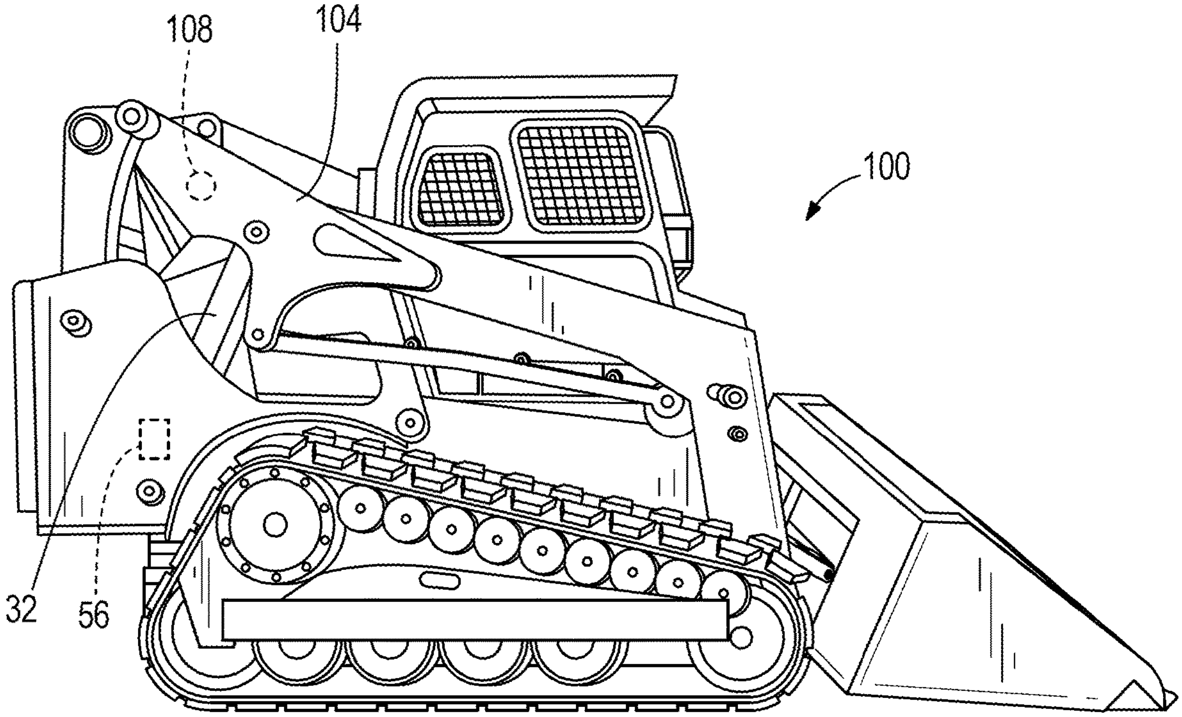
FIG. 5 illustrates an exemplary construction machine.
Figure 6:
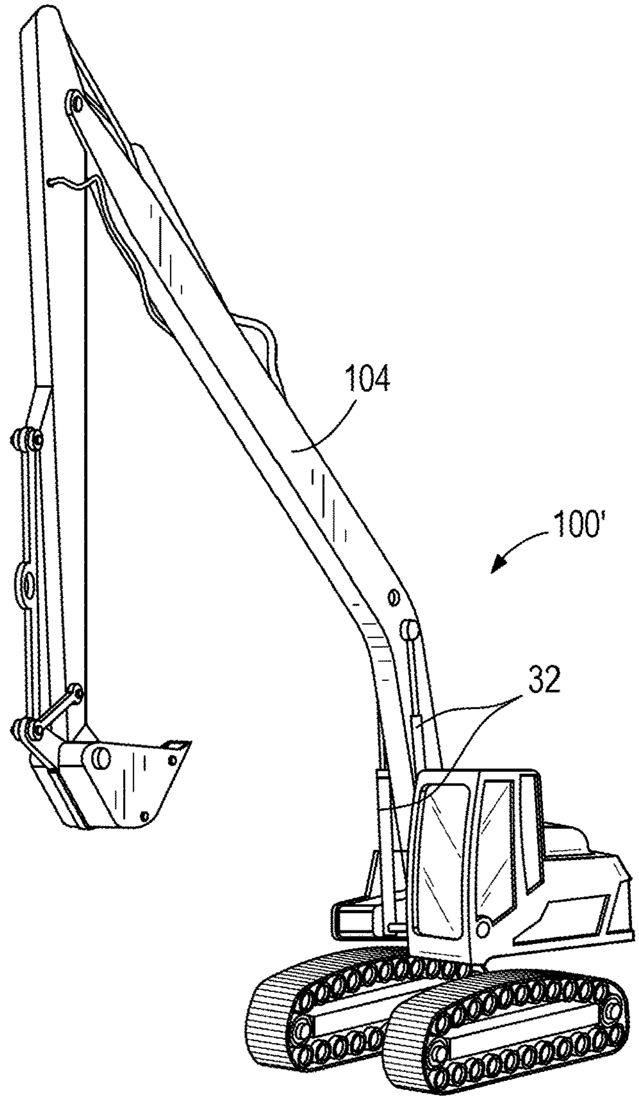
FIG. 6 illustrates another exemplary construction machine.
Figure 7:
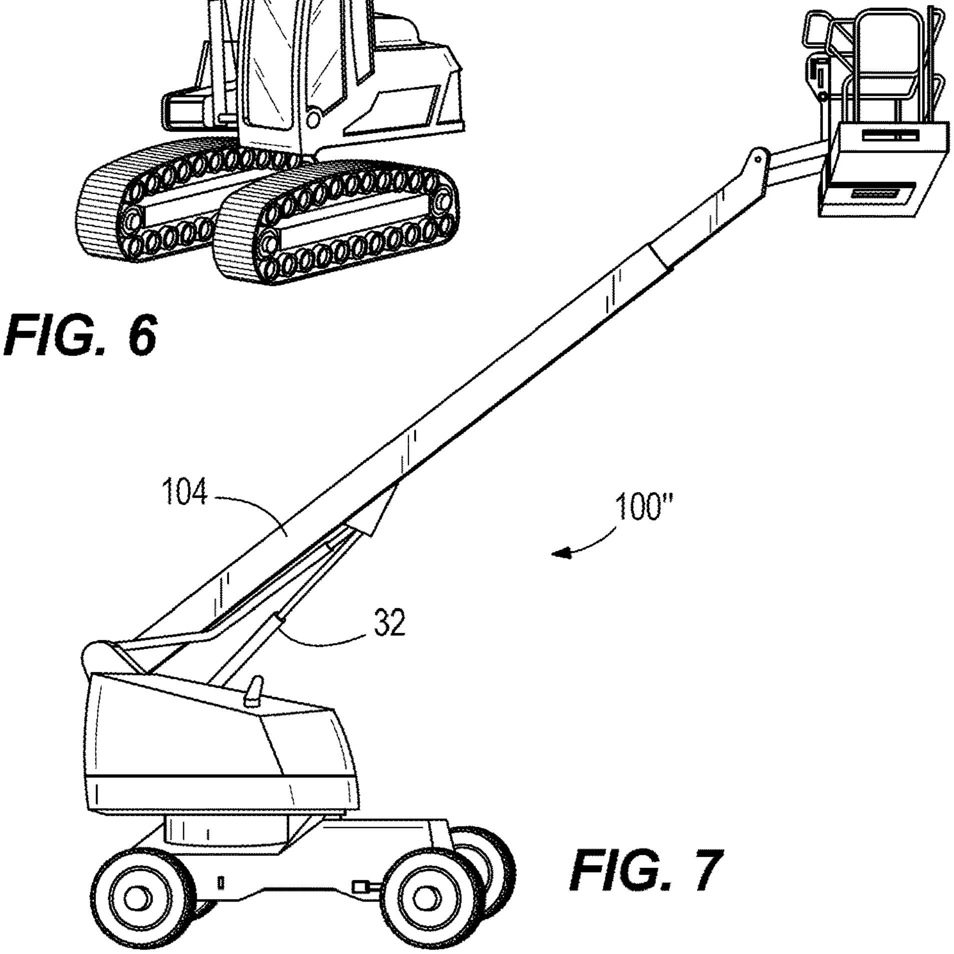
FIG. 7 illustrates yet another exemplary construction machine.

FIG. 3 illustrates an active ride control system 20 according to one embodiment of the present disclosure that provides an active ride control mode of a construction machine 100, 100', 100" (FIGS. 5 to 7). An electronic controller 24 of the construction machine 100, 100', 100" can trigger the active ride control mode in response to travel of the machine above a threshold speed (e.g., as detected by a speed sensor 28 in signal communication with the controller 24). Other parameters may also be used in the controller 24 for triggering the active ride control, either in combination with the threshold speed or in lieu thereof. The boom cylinder 32 has a movable rod coupled with a boom 104 such that the pressure in the boom cylinder 32 (i.e., the base or piston-side chamber, opposite the rod side) supports the total boom load $F_L$. The total boom load $F_L$ can be generated by the weight of the boom 104 and also any additional supported external load (e.g., the contents of a bucket at the end of the boom 104). Active ride control can provide benefits during driving of the unloaded construction machine, but even greater benefit during driving of the boom-loaded construction machine since there is even more potential for pressure fluctuations and bouncing of the loaded boom due to the bucket load.

The two piston-separated chambers of the boom cylinder 32 are coupled via respective lines to the two operational (A and B) ports of the main boom control valve 36. The other side of the main boom control valve 36 has pressure and tank (P and T) ports, which are coupled, respectively, to the outlet of the pump 40 and to the working fluid reservoir 44. The main boom control valve 36 can be a conventional directional valve connected to the controller 24 for position switching. The main boom control valve 36 can have a plurality of different positions to establish different connections. In the illustrated construction, the main boom control valve 36 has four positions, which are arbitrarily designated the "first" through "fourth" positions from top to bottom in FIG. 3. The first position is a parallel position in which the A port is connected to tank T, and the B port is connected to pressure P. The second position isolates all four connections: A port, B port, pressure P, and tank T. The third position is a cross position in which the A port is connected to pressure P and the B port is connected to tank T. The fourth position is a float position in which the A and B ports are connected together and connected to tank T.

The pump 40 is a variable displacement pump (e.g., axial piston pump) connected to the controller 24 for varying the displacement setting (e.g., via swash plate angle). Furthermore, the pump 40 is variable for positive and negative displacement (i.e., reversible flow direction from a flow-producing "Pumping" mode to a flow-receiving "Motoring" mode) and is referred to as having over-center capability as it can switch between positive and negative during operation. The pump 40 may also be referred to as an over-center variable displacement pump. In some constructions, the pump 40 can be a Bosch Rexroth A10VO with eOC control (also called EC4), although other pumps may also be suitable for use. The system 20 utilizes the pump 40 in an open loop hydraulic circuit as shown. In response to movements of a user control (e.g., joystick) of the construction machine, the main boom control valve 36 moves to either the parallel or cross position so that the outlet of the pump 40 supplies fluid to exactly one of the chambers of the boom cylinder 32 while the other chamber is connected through the valve 36 to drain to tank 44. In other words, the P port is connected through the valve 36 to either the A port or the B port, while the other of the A port and B port is connected through the valve 36 to tank 44 via the T port. In this way, the pump 40 and the main boom control valve 36 are used to control a position (extension/retraction) of the boom 104. Although not the subject of the present disclosure, the hydraulic controls circuit for the boom 104 can incorporate load sensing so as to manage the speed of boom movements. As shown in FIG. 3, the pump 40 can be driven by a prime mover such as an internal combustion engine (ICE) for example. The ICE can be used within the construction machine for powering additional functions, including but not limited to traction drive, and additional pumps for additional boom and/or bucket movements or other implements of the machine.

During active ride control, the main boom control valve 36 goes to the bolded position (cross), connecting the A port (base or piston-side chamber of the boom cylinder 32) to pressure P, and connecting the B port (rod chamber side of the boom cylinder 32) to tank T. All flow dynamics for active ride control are managed through the dynamics of the pump 40. The valve 36 does not switch position, but rather maintains the single position, during active ride control. Delay from the valve response is avoided since there is no valve position switch requisition during the active ride control. Valve position is not switched during active ride control mode, and the needed additional flow, or needed flow removal, that the system requires to dampen pressure spikes from boom structure inertia is accomplished through pump dynamics—e.g., solely through displacement setting variation within the pump 40, that can include over-center dynamics of the pump 40. The controlled pump dynamics can refer to actively changing the Pumping/Motoring mode of the pump 7 and actively changing the variable displacement setting within one of these modes. The pump dynamics are controlled by the electronic controller 24 in accordance with instructions from a pre-programmed algorithm stored in a memory and executed by the controller 24. The oscillation of the pressure level, measured by pressure transducer (s) 50, 52, is used to counteract the oscillations of the hydraulic system. The electronic controller 24 coupled to the pressure transducer(s) 50, 52 and the over-center pump 40 uses the pressure information in order to control the displacement setting of the over-center pump 40. Although the described formulation provides that pressure transducers 50, 52 are utilized as feedback signals, other sensors that can perceive the oscillations in the system can also be utilized in alternative or in addition to the pressure transducers. These sensors, for example, can be but are not limited to an inertial measurement unit 56 mounted on the machine (e.g. on the chassis). As noted further below, an inertial measurement unit 108 can also be provided on the boom 104 for communicating forces and/or orientation to the controller 24.

Figure 4:
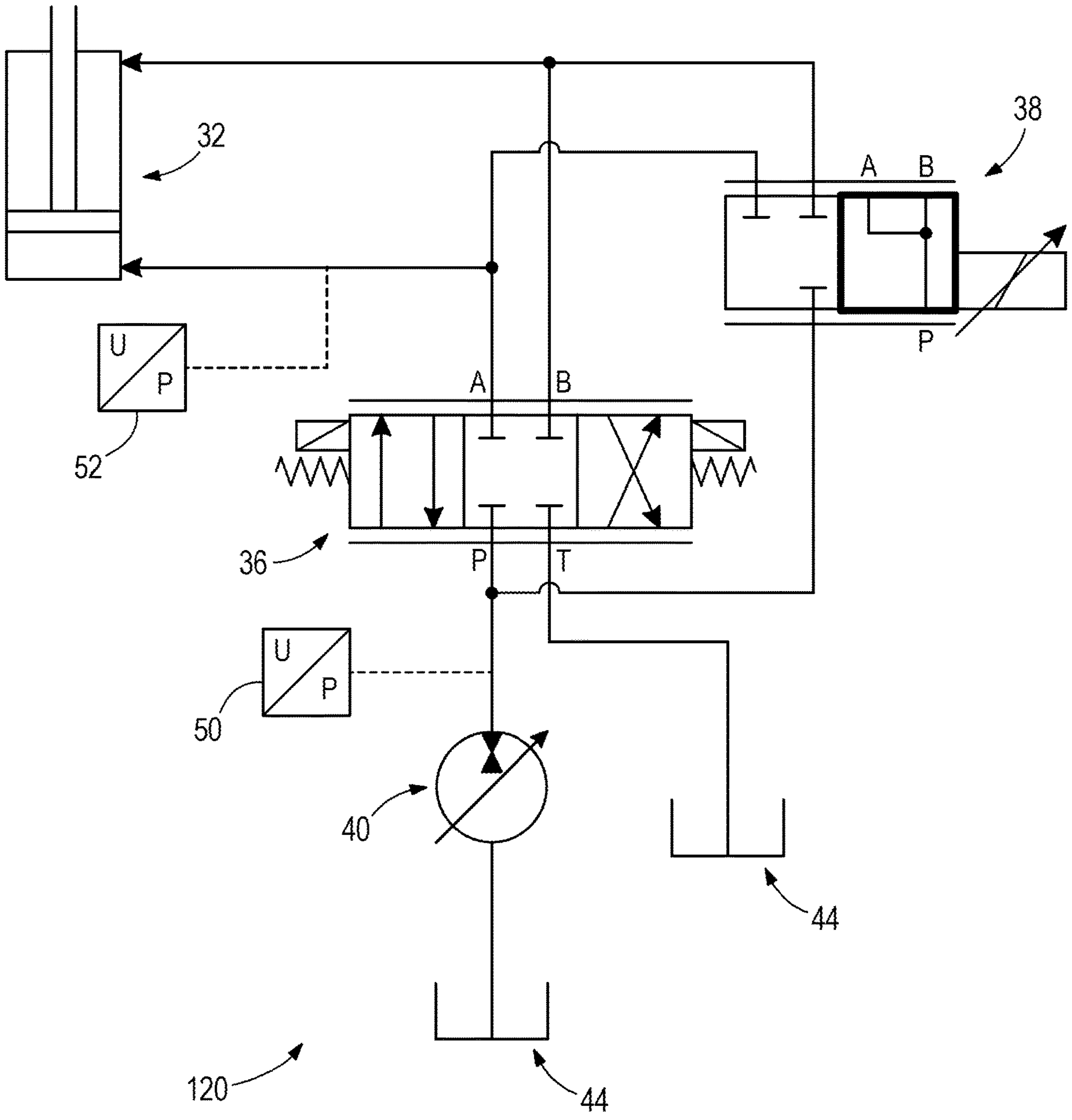
FIG. 4 illustrates an active ride control system for a construction machine, according to another embodiment of the present disclosure.

FIG. 4 illustrates a construction machine active ride control system 120 of another construction as an alternative to that of FIG. 3. Features such as the boom, the pump-driving ICE, and electronic controller are not shown with the understanding that they can be applied in the same manner as shown in FIG. 3. In the system 120 of FIG. 4, the ride control function is provided by a configuration where both chambers of the boom cylinder 32 are connected to pressure P. In other words, the two boom cylinder chambers are connected to each other in parallel. As such, fluid exchange is enabled not only between the boom cylinder 32 and the pump 40, but also between the two piston-separated chambers of the boom cylinder 32. A differential mode control for the boom cylinder 32 includes connecting both chambers of the boom cylinder 32 to pressure P, and a delta pressure control is established. The pressure control is set based on the boom cylinder rod and base ratio. Pressure transducer(s) 50, 52 give feedback to the system controller for generating a control signal to the over-center pump 40, similar to the system of FIG. 3.

The differential pressure control is achieved by a valve 38 that connects both cylinder chambers (ports A and B) to pressure P. As shown, the valve 38 can be a valve separate from the main boom control valve 36, which remains in the closed position (all ports A, B, P, T isolated from each other) during active ride control. In other embodiments, the function of the separate valve 38 can be integrated into the main boom control valve 36 as an additional position that connects the A and B ports to pressure P while isolating tank T.

The position of the valve 38 that is used during active ride control is shown in bold in FIG. 4. When active ride control is not active, the valve 38 (if separate from the main boom control valve 36) remains closed and the main control valve 36 is used instead. Differential pressure during active ride control makes the load balanced and thus increases the damping effect. In addition, flow required to keep the system balanced is reduced because part of flow composition comes from the boom cylinder chamber-to-chamber exchange. The system pressure increases to balance the load by connecting the two chambers. This means that the maximum load, and therefore the maximum payload of the boom (e.g., inside the bucket), can be limited by the maximum pressure allowed in the hydraulic system.

Optional inertia sensors can be used in the system of either FIG. 3 or FIG. 4 to increase the system performance. In some constructions orientation of the boom 104 is monitored by a sensor 108 (e.g., an inertial measurement unit, IMU) so that a signal from the sensor 108 can be input to the controller 24, with the controller 24 operating to control the pump 40 in a way that maintains the orientation of the boom 104 in the orientation set at the time active ride control starts. In addition, based on the sensors reading, when the pressure is low, the need to increase it is met by increasing displacement of the pump 40. When the pressure is too high, the excess oil volume is discharged through the pump 40. During active ride control, any additional implements of the construction machine 100, 100', 100" controlled by flow from the pump 40 are disabled such that the connections and operation of the pump 40 can be dedicated to the active ride control. Neither embodiment (FIG. 3 or FIG. 4) relies on directional valve responses during active ride control as the valve used to establish flow to/from the boom cylinder (either the main boom position control valve 36 or the auxiliary ride control valve 38) remains open and dormant during the designated active ride control mode of the machine.

Although the invention has been described in detail with reference to certain preferred embodiments, variations and modifications exist within the scope and spirit of one or more independent aspects of the invention as described.

What is claimed is:

1. A construction machine comprising:

a variable displacement pump;

a boom cylinder including a rod operable to extend and retract to move a boom of the construction machine, wherein a first chamber of the boom cylinder is configured to be supplied with fluid from the pump during rod extension while fluid is removed from a second chamber of the boom cylinder, and wherein the second chamber of the boom cylinder is configured to be supplied with fluid from the pump during rod retraction while fluid is removed from the first chamber of the boom cylinder;

a valve between the boom cylinder and the pump, the valve configured to selectively control fluid flow to and from the boom cylinder; and an active ride control mode in which the valve between the boom cylinder and the pump is set to a predefined open position and disabled from switching from the predefined open position throughout operation in the active ride control mode, and the pump is configured to actively damp pressure fluctuations in the boom cylinder by variation of a displacement setting.

2. The construction machine of claim 1, wherein the valve that remains open between the boom cylinder and the pump in the active ride control mode is a boom position control valve having multiple positions for selectively controlling the rod extension and the rod retraction.

3. The construction machine of claim 2, wherein the boom position control valve connects exactly one of the first and second boom cylinder chambers.

4. The construction machine of claim 2, wherein the active ride control mode is provided by a rod extension position of the boom position control valve.

5. The construction machine of claim 1, wherein the valve connects both of the first and second boom cylinder chambers together with the pump in the active ride control mode.

6. The construction machine of claim 5, wherein the valve that connects both of the first and second boom cylinder chambers together with the pump in the active ride control mode is an auxiliary valve separate from a boom position control valve having multiple positions for selectively controlling the rod extension and the rod retraction.

7. The construction machine of claim 1, wherein the pump is an over center open circuit pump operable to switch between two opposite flow directions, and the pump is configured to actively damp pressure fluctuations in the boom cylinder by switching the pump between the two opposite flow directions.

8. The construction machine of claim 1, further comprising an electronic controller in signal communication with the valve to control a position thereof and in signal communication with the pump to control the variation of the displacement setting.

9. The construction machine of claim 8, wherein the controller is programmed to enact the active ride control mode in response to the construction machine driving above a threshold speed with the boom in a fixed position.

10. The construction machine of claim 8, further comprising at least one pressure transducer in signal communication with the electronic controller and configured to measure fluid pressure between the pump and the boom cylinder.

11. The construction machine of claim 8, further comprising a sensor operable to detect a boom orientation and report a representative signal to the controller, wherein the controller is configured to control the variation of the displacement setting during the active ride control mode without changing the boom orientation.

12. A method of actively damping a boom of a construction machine, the method comprising:

providing a boom cylinder having first and second piston-separated variable-volume chambers, a rod of the boom cylinder connected with the boom for moving the boom by selective extension and retraction of the rod with a fluid flow from a variable displacement pump;

connecting at least one of the first and second chambers of the boom cylinder with a variable displacement pump through a valve for fluid exchange in an active ride control mode of the construction machine, the valve being set to a predefined open position; and disabling the valve from switching from the predefined open position throughout operation in the active ride control mode while actively damping pressure fluctuations in the boom cylinder by varying a displacement setting of the pump in the active ride control mode.

13. The method of claim 12, wherein the valve is a main boom control valve is used to connect the at least one of the first and second chambers of the boom cylinder with the variable displacement pump in the active ride control mode, the main boom control valve having a first position that supplies fluid from the variable displacement pump to the first chamber to extend the rod, and a second position that supplies from the variable displacement pump to the second chamber to retract the rod, and wherein the pressure fluctuations in the boom cylinder are actively damped without any switching of the main boom control valve during the active ride control mode.

14. The method of claim 13, wherein the pressure fluctuations in the boom cylinder are actively damped with the main boom control valve remaining in the first position during the active ride control mode.

15. The method of claim 12, wherein actively damping pressure fluctuations in the boom cylinder includes connecting both the first and second chambers of the boom cylinder with the variable displacement pump during the active ride control mode.

16. The method of claim 15, wherein the first and second chambers of the boom cylinder are connected with the variable displacement pump during the active ride control mode through the valve, which is an auxiliary valve separate from a main boom control valve that switches positions to extend and retract the rod.

17. The method of claim 12, wherein the active damping of pressure fluctuations in the boom cylinder includes switching the variable displacement pump over-center between positive and negative pump displacement.

18. The method of claim 17, further comprising generating a signal with a controller to vary the displacement setting of the variable displacement pump based on one or more signals input to the controller, including a boom cylinder pressure signal from a pressure sensor.

19. The method of claim 18, wherein the signal generated by the controller to vary the displacement setting of the variable displacement pump is further based on a boom orientation signal from a boom-mounted sensor.

20. The method of claim 12, wherein a controller is programmed to enact the active ride control mode in response to the construction machine driving above a threshold speed with the boom in a fixed position.

* * * * *